United States Patent [19]

Andrae et al.

[11] Patent Number: 4,550,042

[45] Date of Patent: Oct. 29, 1985

[54] SHIRRED SAUSAGE CASING AND PROCESS FOR ITS MANUFACTURE

[75] Inventors: Klaus Andrae, Zornheim; Elfriede Hutschenreuter, Bad Schwalbach, both of Fed. Rep. of Germany

[73] Assignee: Hoechst Aktiengesellschaft, Frankfurt am Main, Fed. Rep. of Germany

[21] Appl. No.: 516,984

[22] Filed: Jul. 25, 1983

[30] Foreign Application Priority Data

Jul. 31, 1982 [DE] Fed. Rep. of Germany ....... 3228675

[51] Int. Cl.$^4$ ............................................. A22C 13/02
[52] U.S. Cl. .................................. 428/36; 138/118.1; 426/105; 426/135; 426/140; 17/42
[58] Field of Search ...................... 138/118.1; 428/36; 426/105, 135, 140, 412–414; 17/42

[56] References Cited

U.S. PATENT DOCUMENTS

| 2,819,488 | 1/1958 | Gimbel | 17/42 |
|---|---|---|---|
| 3,594,857 | 7/1971 | Michl | 17/42 |
| 3,619,854 | 11/1971 | Ilgen et al. | 17/42 |
| 3,766,603 | 10/1973 | Urbutis et al. | 17/42 |
| 3,907,003 | 9/1975 | Regner et al. | 138/118.1 |
| 4,185,358 | 1/1980 | Regner et al. | 17/42 |
| 4,210,981 | 7/1980 | Story | 17/45 |
| 4,401,135 | 8/1983 | Andrae et al. | 138/118.1 |
| 4,401,136 | 8/1983 | Porrmann et al. | 138/118.1 |

FOREIGN PATENT DOCUMENTS

| 0037543 | 10/1981 | European Pat. Off. . |
| 0054162 | 6/1982 | European Pat. Off. . |
| 0073321 | 3/1983 | European Pat. Off. . |
| 1288944 | 2/1969 | Fed. Rep. of Germany . |

OTHER PUBLICATIONS

European Search Report.
U.S. application Ser. No. 498,474=EP-OS 0,037,543.
U.S. application Ser. No. 498,524=EP-OS 0,054,162.

Primary Examiner—John E. Kittle
Assistant Examiner—James J. Seidleck
Attorney, Agent, or Firm—Schwartz, Jeffery, Schwaab, Mack, Blumenthal & Evans

[57] ABSTRACT

Disclosed is a shirred sausage casing comprising a tubular casing having an area of increased thickness, e.g., a glued seam, running in the direction of its longitudinal axis. This area of increased thickness is helically arranged and extends transversely to the helical windings of the main-fold constituting the outside of the shirred sausage casing. The area of increased thickness is displaced by its width, between two contiguous windings of the main-fold. Also disclosed is a process for manufacturing a casing of this type.

11 Claims, 9 Drawing Figures

SHIRRED SAUSAGE CASING AND PROCESS FOR ITS MANUFACTURE

BACKGROUND OF THE INVENTION

The present invention relates to a shirred sausage casing and to a process for its manufacture. The shirred sausage casing is also referred to as "shirred stick".

A shirred sausage casing is disclosed in European Patent Application No. 0,037,543, which suggests the use of the device disclosed in U.S. Pat. No. 4,185,358 for shirring sausage casings possessing areas of increased thickness in the form of glued seams. By means of this particular shirring device, the tubular casing is automatically twisted during the shirring operation. According to this publication, twisting is, for example, effected in such a way that a shirring mandrel is used which is smaller than the conventionally employed shirring mandrel. As a result, the glued seam zone of a tubular casing is arranged, in a helically wound manner, about the longitudinal axis of the shirred tubular casing. However, the process results in the casing having far less than 10 helical windings of the seam zone per 10 m of casing length, which is insufficient for a high shirring ratio. Moreover, it is impossible in this way to achieve a reproducible pitch of the helically wound seam zone. Also, the hollow space in the interior of the shirred stick does not have a perfectly circular cross section, due to the fact that at least part of the relatively thick seam zone is displaced into the hollow space during shirring.

It has also been proposed, for example in European Patent Application No. 0,054,162, to helically twist a sausage casing with a glued seam during shirring by using a shirring device in accordance with any of U.S. Pat. Nos. 2,819,488, 3,619,854, 3,594,857 or 3,766,603. The number of windings per 10 m of tube length varies between 0.5 and 10. More than 10 windings per 10 m of tube length cannot be achieved by helically twisting the tube during shirring. Moreover, European Patent Application No. 0,054,162 does not indicate how the windings of the glued seam extend across the main-folds of the shirred stick. It is also not suggested to increase the breaking strength of the shirred casing by a special arrangement of the glued seam, particularly since, according to this prior publication, importance is only attached to the number of windings of the glued seam.

SUMMARY OF THE INVENTION

It is therefore an object of the present invention to provide an improved shirred sausage casing of the general type discussed above. It is a further object of the invention to provide a shirred sausage casing which exhibits a substantially higher breaking strength and, at the same time, a uniform and straight interior hollow space having a circular cross section and a relatively smooth wall, so that the shirred sausage casing can be pushed onto the stuffing horn of a stuffing machine without any problems, even in the case of stuffing horns having relatively large diameters, which permit a quick and thus economical filling of sausage meat into the shirred sausage casing.

It is further an object of this invention to provide a process for manufacturing such a shirred sausage casing In accomplishing the foregoing objects, there is provided in accordance with the present invention, a shirred tubular sausage casing in the form of a hollow cylinder comprising an internal hollow space having a substantially circular cross-section, a strip-shaped area of increased thickness helically arranged about the longitudinal axis of the casing, a continuous helical main-fold structure of individual windings constituting the outside of the hollow cylinder, and a secondary fold structure having fold lines which are arranged to form a continuous zig-zag line between the windings of the main-fold structure, wherein the strip-shaped area has a minimum width of about 1 mm and a maximum width amounting to about 10% of the circumference of the casing in the unshirred state and extends transversely to the main-fold structures, being displaced by its width with a tolerance of not more than about ±10% of its width in the circumferential direction of the shirred casing between two consecutive main-fold windings.

Additionally, in accordance with another aspect of the present invention, there is provided a process for manufacturing a shirred sausage casing comprising the steps of forming a web material into a tubular casing having a seamed area of increased thickness, twisting the casing, flattening the casing in the twisted state and winding the casing onto a roll, unwinding the twisted casing, passing the twisted casing to a shirring mandrel, positioning the twisted casing on the mandrel by internal gas pressure, shirring the twisted casing against a stop, the shirring mandrel having a speed of rotation ($U_{RE}$) corresponding to $U_s \times AU/(b \pm b/10)$, wherein $U_s$ is the speed at which the casing was originally twisted, AU is the outer circumference of the casing and b is the width of the area of increased thickness, to form a helically main-fold structure and secondary-fold lines in the form of a zig-zag line between the main-fold structure.

Advantageously, the shirred sausage casing of the present invention, despite its area of increased thickness, particularly in the form of a relatively thick glued seam, can be shirred to produce a substantially increased dense packing and, at the same time, to possess a substantially uniform outer circumference and a substantially uniform, circular inner circumference. The hollow space of the shirred stick is straight and has an essentially smooth inner wall, despite the thickness in the area of the glued seam. The processes can be performed with particular ease and without any constructional changes to the shirring device. By means of these processes, it is surprisingly possible to arrange the relatively thick seam zone, comprising at least two layers of material, in the wall of the shirred stick, in such a way that the outer surface and also the inner surface of the shirred stick are smooth and uniform, so that the shirred casing can be pushed onto stuffing horns having relatively large diameters and can be uniformly unshirred and drawn from the stuffing horn during stuffing, without any problems.

Other objects, features and advantages of the present invention will be more fully appreciated from the following detailed description of the preferred embodiments when considered in connection with the accompanying drawings.

BRIEF DESCRIPTION OF THE DRAWINGS

In the drawings:

FIG. 1b is a sectional view along the line Ib—Ib in FIG. 1a;

DETAILED DESCRIPTION OF PREFERRED EMBODIMENTS

Tubular casings having areas of increased thickness in the form of one or several seams extending in the direction of their longitudinal axes and the manufacture of such casings by adhesively bonding the edge zones of a film web, parallel to the longitudinal axis of the web are known per se and are, for example, described in the aforementioned European Patent Applications Nos. 0,037,543 and 0,054,162.

The glued seam is produced by overlapping and adhesively bonding the two edge zones extending in the direction of the longitudinal axis of a film web which has been bent to form a tube. It is also possible to produce the glued seam by forming a tube from a web, with the edges running parallel to the longitudinal axis of the web abutting, i.e., without overlapping the edges, and then joining the two edge zones with the aid of a film strip. The expression "width of the glued seam" does not refer to the width of the adhesive layer, but to the width of the area, in which the edge zones overlap each other or are overlapped by the film strip. In the area of the glued seam, the tube thus has at least twice the thickness of the casing material or the thickness of the tube represents the thickness of the casing material and the thickness of the film strip. Usually, the width of the glued seam comprises up to about 10% of the circumference of the tube and should be at least about 1 mm.

Preferred flexible base materials used for the manufacture of the tubular casing include cellulose, i.e., cellophane, regenerated cellulose or cellulose hydrate, if appropriate, reinforced with a fiber insert, of the type customarily used in the packaging of foodstuffs, and, in particular, in the packaging of sausages.

Additionally, the shirred tubular casing may have conventionally applied coatings on its inner and/or outer surfaces, for example, the inner surface may be provided with an agent improving the peelability of the tubular casing from the filling.

Figure 1:
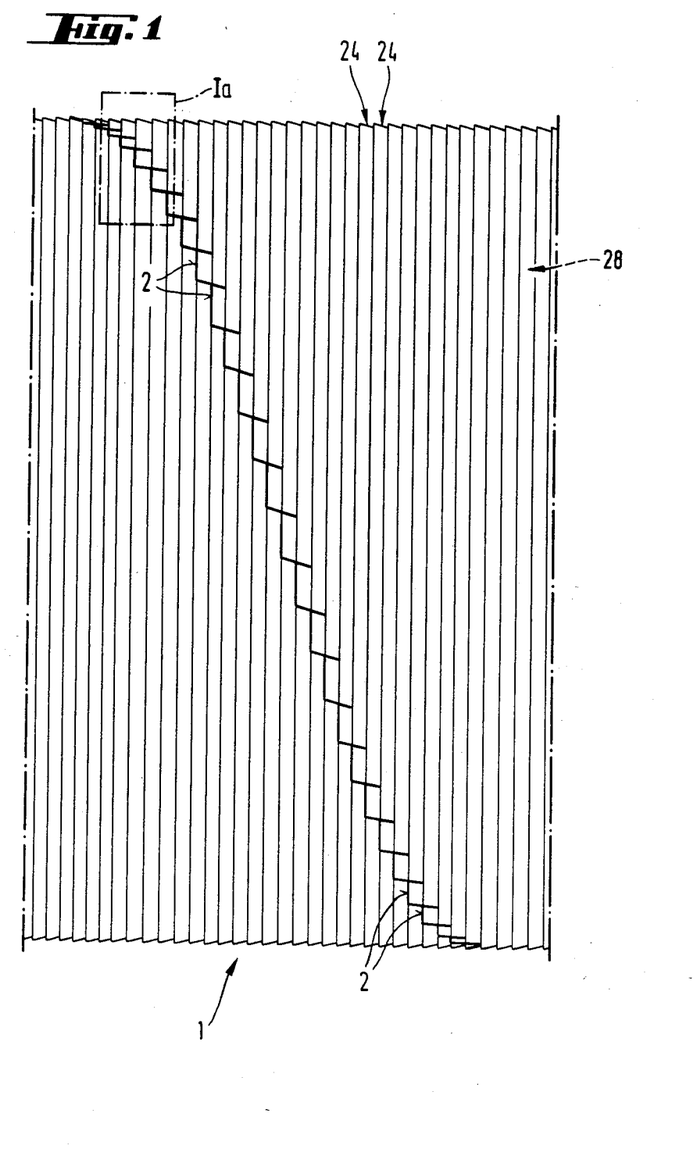
FIG. 1 schematically illustrates an example of a shirred sausage casing according to the invention.
Figure 1A:
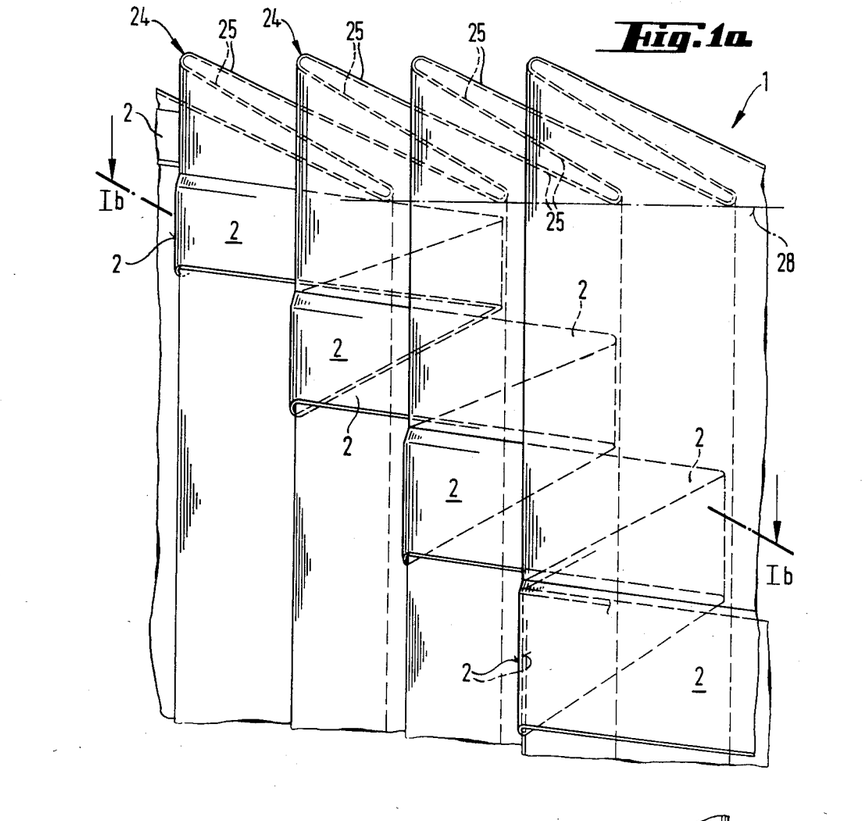
FIG. 1a is an enlarged perspective view of the shirred sausage casing according to FIG. 1, showing approximately the area marked Ia in FIG. 1.
Figure 1B:
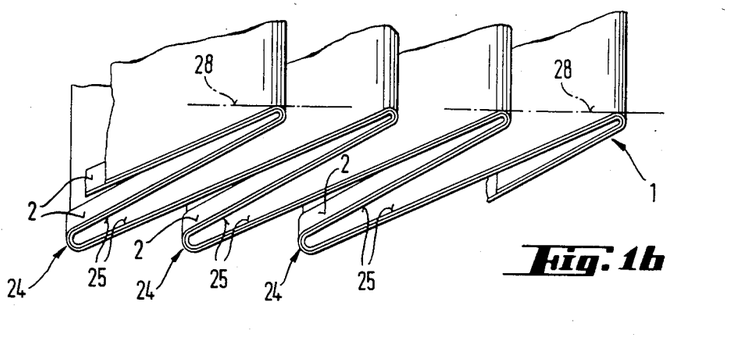

Turning now to the Figures, the shirred tubular casing 1 in FIG. 1 shows a helically wound seam area 2 having a uniform pitch. The part of the seam area 2 indicated by broken lines in FIG. 1a lies in the double layer 25 between two windings of the main-fold 24. The numeral 28 denotes the internal hollow space of the shirred stick. FIGS. 1a and 1b are detailed and enlarged views of the shirred stick 1 which is shown in a slightly extended state.

Figure 2:
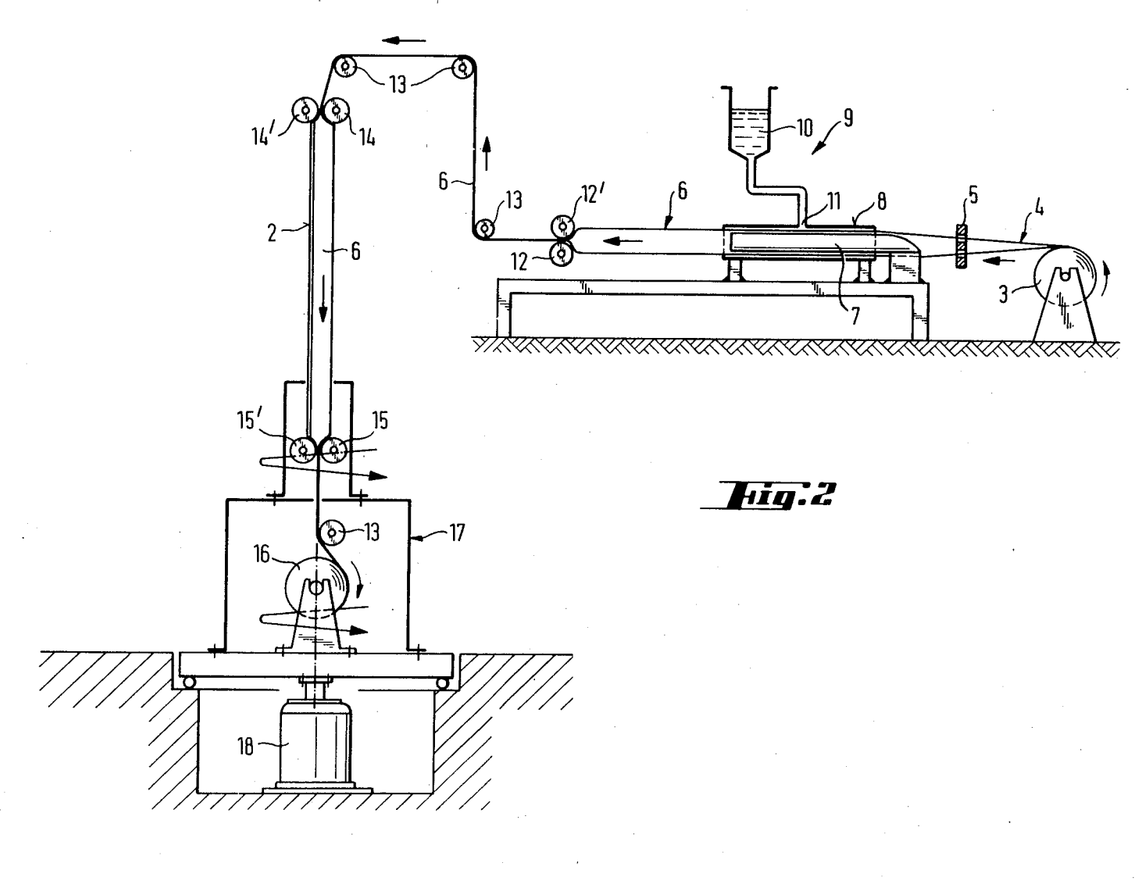
FIG. 2 schematically illustrates a process for manufacturing a tube from a web and winding up the twisted tube.

In FIG. 2, a cellulosic web 4 is drawn from a roll 3, passed through a shaping templet 5 and formed into a tube 6, by means of a support tube 7 and a sleeve 8, the two edges of the web being approached to one another in the shaping templet 5. The support tube 7 and the sleeve 8 serve to aid in the tube-forming process, by supporting the tube both from the inside and the outside.

An applicator device 9 which has a nozzle 11 applies an adhesive solution 10 in the form of a strip between the overlapping edge zones of the web 4. After passing between the draw rollers 12 and 12' and deflecting rollers 13, the tube is inflated between two pairs of squeeze rollers 14 and 14' and 15 and 15' and is then wound onto a roll 16.

The pair of squeeze rollers 15 and 15' and the roll 16 are mounted on a common support 17, which is rotated by a drive motor 18. As a result of this rotation, the tubing seam 2 is twisted while the tube is wound onto the roll 16.

Figure 3:
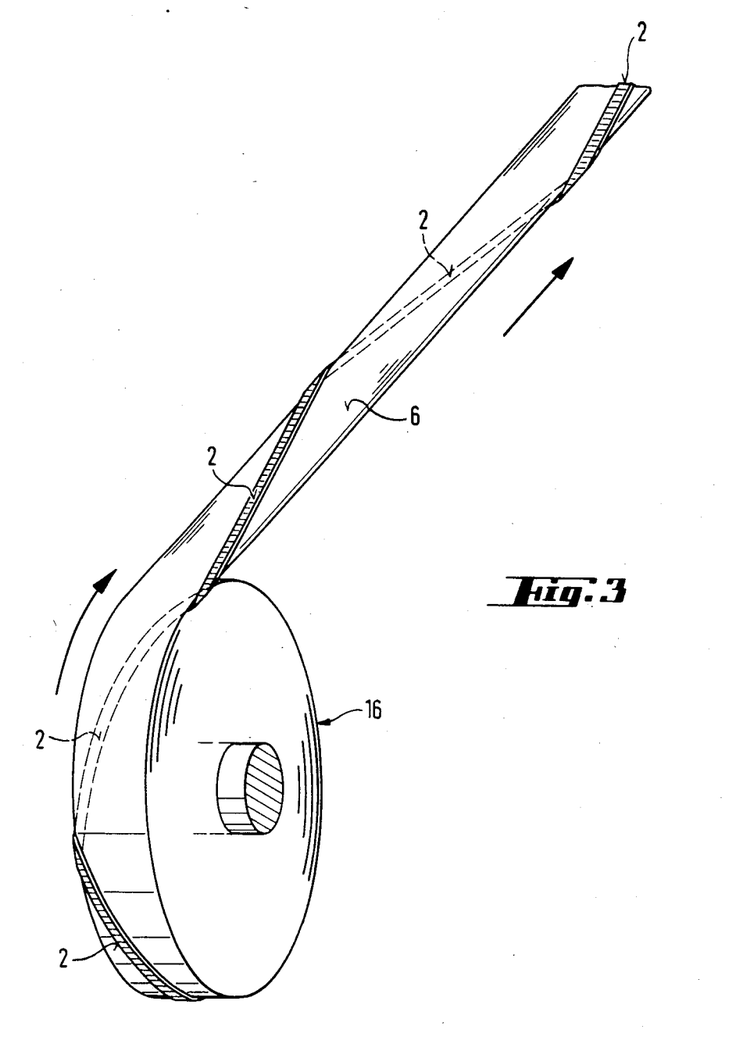
FIG. 3 is a perspective view of the roll of tubing of FIG. 4.
Figure 4:
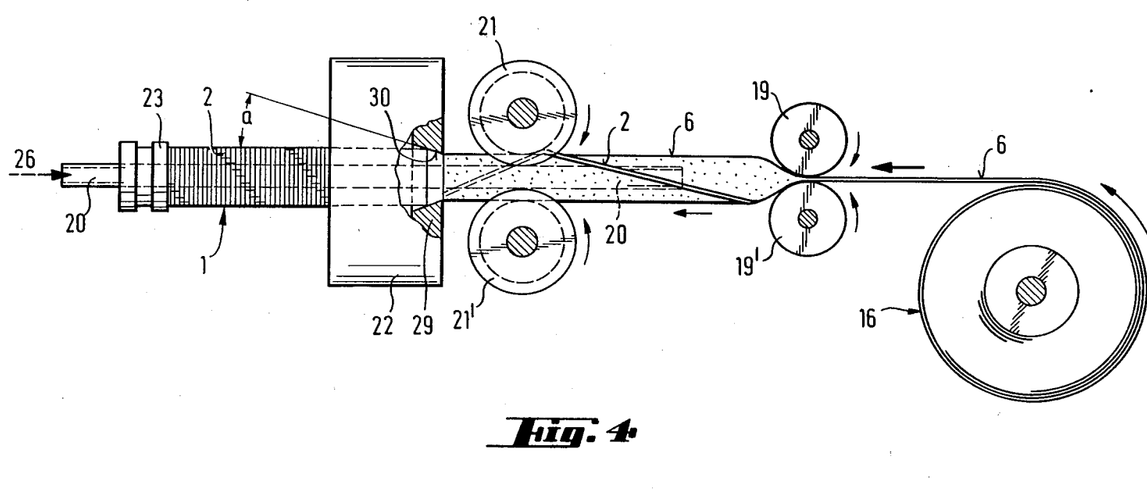
FIG. 4 is a schematic view of the manufacture of a shirred tubing by unwinding tubing material from a roll on which it has been wound in the twisted state.

In FIGS. 3 and 4, the same reference numerals as in the preceding Figures are used for identical parts. As shown in FIG. 4, the twisted and wound up tube 6 is pulled from the roll 16 and after passing between squeeze rollers 19 and 19', it is kept in the inflated state by introducing air 26 through a shirring mandrel 20, in a known manner. The inflated tube 6 moves between two further driven rollers 21 and 21' towards a sleeve-shaped shirring element 22, where the actual shirring operation takes place. Reference numeral 23 indicates a stop, against which the tubing is compressed to form the shirred stick 1.

Figure 5:
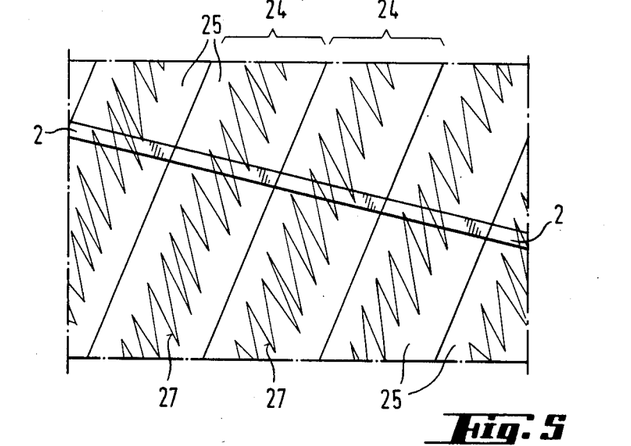
FIG. 5 illustrates the fold pattern in a stick which has been deshirred and cut open.

FIG. 5 shows the fold pattern and the course of the seam area 2, which appear when the stick is deshirred and the tubular casing obtained is cut open in the direction of its longitudinal axis and then laid flat. The zig-zag lines of the secondary fold 27 are present between the fold lines of the helical main-fold 24.

Figure 6:
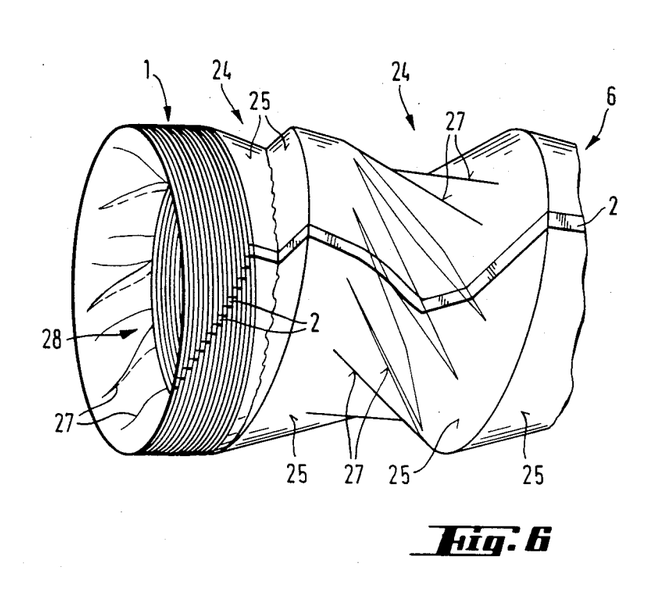
FIG. 6 is a perspective view of the shirred stick which has partly been extended.

FIG. 6 represents a portion of the shirred stick 1 which is partly extended at one end thereof to show a piece of the tubular casing 6.

Figure 7:
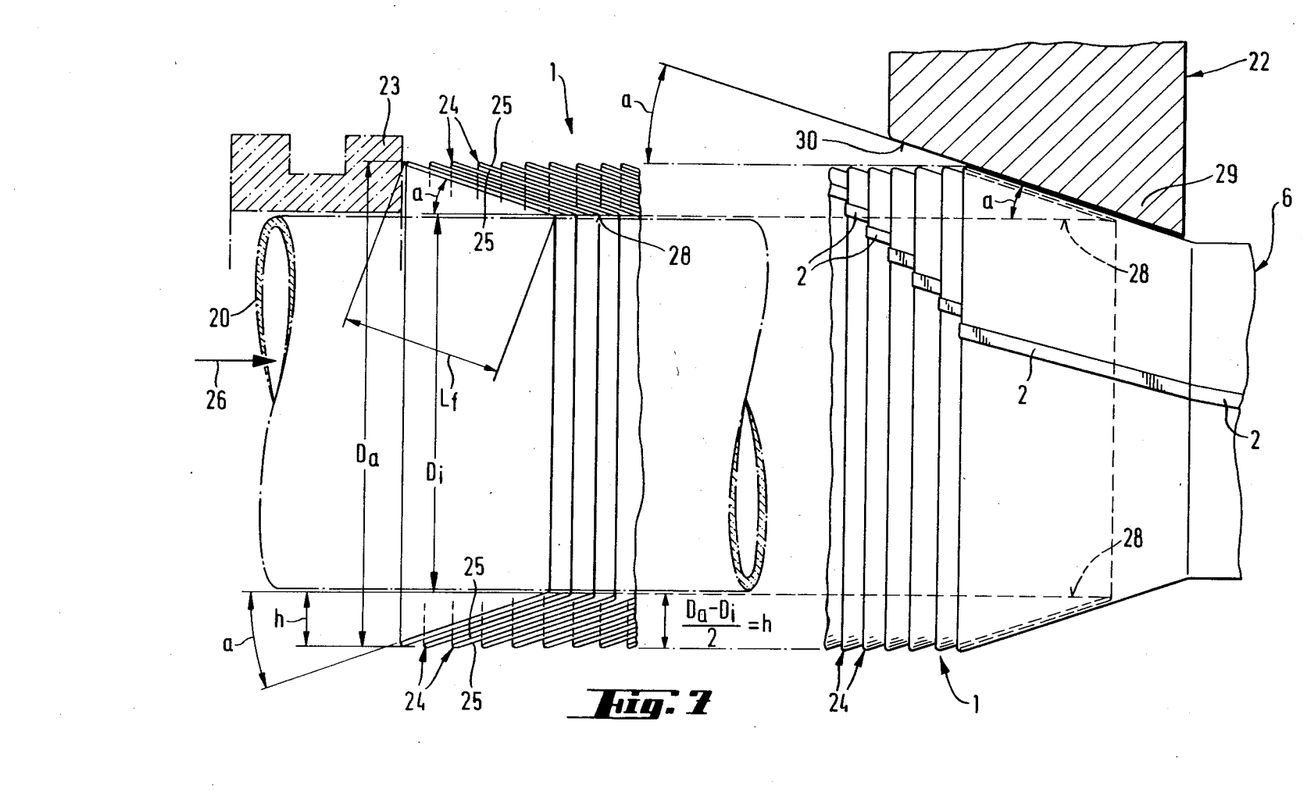
FIG. 7 is a perspective and partial sectional view of the bevel which has the inclination according to the present invention and against which the casing can be pushed.

FIG. 7 shows the end 29 of the helically wound projection of the sleeve-shaped shirring element 22, which faces the stop 23 (FIG. 4) and the shirred tubular casing 1. The present FIG. 7 serves to explain the angle which is included between the surface of the shirring fold, extending from the winding of the main-fold 24 to the inner surface of the shirred stick in the hollow space 28, and the longitudinal axis of the shirred stick or the angle a of the bevel 30, respectively. The angle a can be determined from the height of fold h, resulting from half the difference between the outside and inside diameters $D_a$ and $D_i$, respectively, of the shirred stick and the length $L_f$ of the shirring fold. For this purpose the following relation applies:

$$\sin a = \frac{h}{L_f} = \frac{D_a - D_i}{2L_f}$$

The abovementioned surface of the shirring fold forms the surface of a frustum with respect to the longitudinal axis of rotation and shows the inclination of the double layer 25 which is present between two contiguous windings of the main fold 24.

The shirred sausage casing of the invention reflects the fold structure disclosed in U.S. Pat. No. 3,907,003, comprising on outwardly projecting main-fold or primary folding in the form of a helical line and secondary folds arranged between the windings of this main-fold and the internal space of the shirred sausage casing. The helical primary folding is arranged on the outer circumference and actually constitutes the outer circumference.

When the shirred sausage casing is deshirred and laid flat and the flat tube thus obtained is cut open in the longitudinal direction and unfolded the helical primary folding forms parallel straight folding lines on the unfolded material, which extend at an angle of less than 90° and greater than 60° to the longitudinal axis of the film strip obtained. The secondary fold structure is present between the inside and outside diameters of the shirred stick.

In the folded state, on the other hand, the helical main-fold is on the outside of the shirred stick, while the secondary folds are in the double layer of casing material. A double layer of casing material is thus, in each case, located between two contiguous windings of the helical main-fold.

The secondary folds are particularly regularly formed. When the shirred sausage casing is extended, the readily perceivable lines of the secondary folds appear as a continuous, uniform zig-zag line. The peaks of the zig-zag line have a substantially constant distance from the helical line of the main-fold and the individual sections of this zig-zag line form helical sections which wind in the opposite direction to the main-fold. Other than the zig-zag shaped secondary fold, there are practically no further secondary folds in the shirred sausage casing.

The strip-shaped glued seam runs helically around the longitudinal axis of the shirred sausage casing and when the casing is extended it is found that the glued seam extends helically around the tubular casing in the form of a strip and exhibits a number of windings per unit of length of the deshirred tubular casing, which is substantially smaller than the number of windings of the main-fold. The glued seam extends transversely across the windings of the main-fold, and between two contiguous windings of the main-fold, the seam is displaced by an amount wnich just corresponds to its width, with a maximum tolerance of ±10%, preferably ±5%, of the glued seam width. A particularly dense and uniform packing of the tubing material is obtained in the shirred stick, if the glued seam is shifted exactly by its width between two contiguous windings of the main-fold.

According to the invention, shirred sticks of a particularly high breaking strength are obtained, if the inclination of the double layer of casing material in the shirred tubular casing, with respect to the longitudinal axis of the casing is as small as possible, i.e., if the angle included between the double layer and the longitudinal axis of the shirred stick is smaller than about 35°, and preferably ranges between about 20° and 30°. Such a narrow angle of inclination is, for example, produced with the aid of the rotating sleeve-shaped shirring element disclosed in U.S. Pat. No. 4,185,358, by correspondingly modifying the helically wound projection in the cylindrical interior of the shirring element. This projection is, for example, provided with a bevel at its end facing the shirred stick. The angle of the bevel corresponds to the desired angle between the double layer and the longitudinal axis of the shirred stick.

It is an essential characteristic of the process of the invention that the casing is twisted prior to and/or during shirring. This is preferably effected by twisting the casing prior to shirring and then winding the twisted casing onto a roll, from which the twisted casing is passed to the shirring device. It is particularly advantageous to twist the casing during its production, immediately after forming the seam, and to wind flatly the twisted casing. In the latter case, the glued seam formed by gluing the edge zones of the endless web, is twisted immediately after forming the tubular casing and then laid flat and wound onto a roll.

A suitable device for the above procedure comprises, for example, a first pair of draw rollers, which draw the glued tube from the gluing station, and a second pair of draw rollers, which rotate about the longitudinal axis of the casing, thereby twisting the casing as it leaves the second pair of draw rollers. Between the two pairs of draw rollers, the tube is inflated with a supporting gas and kept in this inflated state.

In the gap between the second pair of draw rollers, the casing is simultaneously laid flat. To avoid the formation of creases in those casings having a relatively great diameter, for example, 120 mm, elements may be provided near the gap between the rolls, by which the tubing is steadily flattened, and thus, gradually laid flat before reaching the gap between the draw rollers. These elements may, for example, be converging templets, gravity-roller conveyors, conveyor belts or guide rollers, such as are customary, for example, in the production of extruded plastic tubings.

All elements used for twisting, laying flat, and winding rotate at identical speeds about the longitudinal axis of the casing. Therefore, these parts are advantageously arranged on a common support which rotates, and may also be part of the tube-forming equipment.

The degree to which the tubular casing, and thus the glued seam, is twisted, is determined by the speed of rotation of the above elements or, respectively, of the support and by the speed at which the tubing is advanced.

If the casing is, for example, advanced at a speed of 5 m/min, or, if a tube is formed from a web at this speed, and the number of revolutions of the twisting elements is 5 per minute, the number of windings of the casing per 10 m tubing length is 10. If the advance speed of the casing is 200 m/min and the number of revolutions is 200 per minute, the number of windings per 10 m tubing length is also 10. If the shirring ratio is, for example, 100:1, and the number of windings is 10 per 10 m tubing length, the distance between two helical windings on the shirred stick is 1 cm. Likewise, if the shirring ratio is 50:1 and the number of windings is 10 per 10 m tubing length, the distance between two helical windings is 2 cm. A densely shirred stick is obtained by means of this process, when the number of windings per 10 m tubing length exceeds 10, i.e., when the distance between two helical windings on the shirred stick is less than 1 cm and the shirring ratio is higher than 100:1. Correspondingly, if the shirring ratio is higher than 50:1, the distance between two helical windings is less than 2. This optimum number of windings per 10 m tubing length is obtained by appropriately adapting the advance speed of the casing to the speed of rotation, the preferred range of the advance speed of the casing being between about 5 and 200 m/min and the preferred speed of rotation being between about 5 and 200 rpm. The adaption of the advance speed of the casing to the speed of rotation is determined by the quotient of the speed of rotation (rpm) and the advance speed of the casing (m/min). This quotient (revolutions/m) is preferably greater than about 1 but not greater than about 4. With these values, densely shirred sticks are obtained from casings having a glued seam.

By varying the ratio of speed of rotation to advance speed of the casing, any other pitch of the glued seam, i.e., any other number of windings of the casing per unit of length can be set.

The shirring mandrel is a hollow tube which supports the tubular casing and defines the inside diameter of the shirred casing formed during the shirring process. In addition, the shirring tube slightly inflates the casing in order to impart a taut shape to the casing as required for proper shirring by the shirring forces.

In another embodiment, the sausage casing is rotated about the shirring mandrel, whereby the shirred folds are twisted into a screw-like pattern, this step optionally being in addition to the prior helical twisting. For this procedure the above-mentioned values for speed of rotation and advance speed of the casing apply.

The shirring force is applied by an element which rotates about the longitudinal axis of the tubular casing. During the shirring process, this element is constantly in positive engagement with the tubular casing and exerts sufficient pressure on the casing to form the bending-resistant shirred stick (cf. U.S. Pat. No. 4,185,358). If appropriate, a lubricant and/or moistening agent is applied to the tubular casing prior to or during the shirring process. The shirring device includes a shirring member and a stop. The shirring member comprises an annular element surrounding and being rotatable about the tubular casing, to which the element used for shirring and engaging the tubular casing is attached.

The annular element comprises a basically known rotating sleeve which is helically toothed on the inside thereof and exerts an axially compressing force on the tubing material (cf. U.S. Pat. No. 4,185,358). The cylindrical internal space of the sleeve is provided with a helically wound projection which stands out from the inner wall of the sleeve in the form of a spiral winding. By means of this process or this device, respectively, the typical fold structure comprising a helical main-fold and a zig-zag shaped secondary fold is obtained. For an ideal displacement of the strip-shaped area of increased thickness, particularly the glued seam, between successive main-folds, it is necessary, according to the present invention, to choose the speed of rotation $U_{RE}$ (rpm) of the rotating sleeve-shaped shirring element in such a way that its ratio to the speed of rotation $U_s$ (rpm) at which the tube is rotated or twisted during its manufacture and/or shirring, corresponds to the following relation:

$$\frac{U_{RE}}{U_s} = \frac{\text{outer circumference of the shirred stick}}{\text{width of the area of increased thickness (seam area)}}$$

Ideally, the two speeds of rotation thus have a ratio which results from the ratio between the outside circumference of the shirred stick and the width of the area of increased thickness or the seam area, respectively.

The invention is explained in further detail with reference to the following examples.

EXAMPLE 1

Viscose is extruded through a gap into an acid coagulation bath. The web of cellulose hydrate gel obtained, after regeneration, is passed through a plasticizer bath comprising a 9% by weight strength aqueous solution of glycerol. After drying, the resulting web of regenerated cellulose has a weight per unit area of 41 g/m$^2$, a water content of about 8% by weight and a glycerol content of about 15% by weight. If appropriate, the water content is adjusted by remoistening. Moreover, the web material has an ultimate tensile strength of about 48 to 53 N/mm$^2$ in the transverse direction.

The cellulose web is cut into 60 mm wide tapes. By means of the equipment shown in FIG. 8 of European Patent Application No. 0,037,543, the disclosure of which is herein incorporatedby reference, each cut piece in the form of tape is coated stripwise, along one of its two edges, in the longitudinal direction of the tape, with a 12% by weight strength aqueous solution (pH 7.5, adjusted with concentrated ammonia solution) of a water-soluble cationic resin and is formed into a tube, as is also shown in FIG. 8 of European Patent Application No. 0,037,543. The cationic resin is a reaction product of ethylene diamine, adipic acid, diethylene triamine and epichlorohydrin and is commercially available in the form of 12 and 20% by weight strength aqueous solutions, under the name of ®RESAMIN HW 601 (manufacturer Cassella).

For this purpose, the solution is transferred by means of a rotating applicator roller, having a width of approximately 2 mm, from a supply trough to the running film tape, the coating assuming a width of about 2 to 3 mm on the tape and having a wet layer thickness of about 10 to 12 μm. The tape, which is coated near the edges, is formed into a tube having a diameter of 18 mm, by means of shaping aids, which engage the outer and inner surfaces of the tape in such a way that the edge coated with the solution and the uncoated edge overlap by about 3.5 mm (=width of the seam area). The regions near the edges form, in each case, an overlapped glued seam running in the longitudinal direction (see FIG. 1 of European Patent Application No. 0,037,543), in which the resulting adhesive layer corresponds to a weight per unit area of about 1 to 2 g/m$^2$. About 1 to 2 seconds after the formation of the overlapping seam, the tubing is laid flat, inflated with a supporting gas between two pairs of draw rollers, twisted and laid flat by the second pair of draw rollers rotating about the longitudinal axis of the tubing, and subsequently wound onto a roll. The tubing is advanced at a speed of 40 m/min, the speed of rotation Us (number of revolutions) is 120 rpm, the pitch of twist (distance between helical windings) amounts to 33.3 cm.

The tubular casings thus manufactured and wound up in the twisted state are stored for 3 days and then drawn from the roll at a speed of 40 m/min and shirred at a shirring ratio of 1:75, using the apparatus described in U.S. Pat. No. 4,185,358, the disclosure of which is herein incorporated by reference. The shirring mandrel is stationary and has a diameter of 11.5 mm. The internal thread of the sleeveshaped shirring element shows a bevel of 30°, relative to the axis of rotation, at its end facing the shirred stick. The shirred sticks obtained have an outside diameter of 18 mm and an internal hollow space having a diameter of 11.5 mm. The distance between the helical windings of the seam area on the shirred sticks is 0.45 cm.

The distance between helical windings (cm) results from the relation $$\frac{\text{Advance speed of tube on winding up (m/min)} \times 100}{\text{Speed of rotation (rpm)} \times \text{shirring density}}$$

The shirring density is the quotient of length of tubing/length of shirred stick and has the usual values, i.e. ranging between 20 and 120.

In various experiments (Samples A to H, see Table 1), the sleeve-shaped shirring element rotates at different speeds of rotation $U_{RE}$. According to the above-indicated relation the following applies:

$$\frac{U_{RE}}{120} = \frac{18\pi}{3.5}$$

From this results a value of approximately 1938 rpm for the optimum speed of rotation $U_{RE}$ of the shirring element.

The breaking strength of the sample sticks is tested by measuring the breaking moment B. For this purpose, a shirred stick is supported at a distance of 20 cm (L=length of the sample=20 cm) and is subjected to a load p (N) up to breaking. The breaking moment B is then (L/2)p.

TABLE 1

| Sample Stick | A | B | C | D | E | F | G | H |
|---|---|---|---|---|---|---|---|---|
| Speed of rotation ($U_{RE}$) of the shirring element (rpm) | 1820 | 1872 | 1938 | 1990 | 2042 | 2353 | 2500 | 2666 |
| Breaking moment B (N · cm) | 80 | 90 | 100 | 90 | 70 | 50 | 40 | 30 |

It is found that the shirred stick C has the highest breaking strength and possesses a very smooth and uniform appearance. In this sample, the displacement of the seam area is such that from one main-fold to the next on the outer circumference of the shirred stick, the seam area is shifted by exactly one width thereof (3.5 mm), whereas this ideal condition is not present in the other samples. In samples A and B, the overlapped zone is displaced in such a way that, from one main-fold to the next the seam area is shifted by more than one width thereof in the circumferential direction. In samples D to H, the seam areas are increasingly overlapped from one main-fold to the next.

Due to their excellent uniformity and breaking strength, the shirred sticks according to C are the most suitable for use on high-performance filling machines. Although sample sticks A, B and D do not show optimum properties, their breaking strength is still sufficient for use on ordinary filling machines.

The internal hollow spaces of sample sticks A to D are straight and have smooth interior walls. The shirred sticks can be pushed onto the stuffing horn of a stuffing device, without any problems and are uniformly filled with sausage emulsion.

EXAMPLE 2

Using the twisted roll of tubing of Example 1, shirring is carried out with the adjustment of the shirring machine corresponding to that used for Sample C of Example 1. In this example, however, sleeve-shaped shirring elements are employed which have internal helical projections, the bevels of which, at the end facing the shirred stick, are varied in the range between 40° and 20°.

Shirred sticks are obtained which exhibit the ideal case of a successive displacement of the seam area, but which differ in their breaking strengths. The results are as follows:

TABLE 2

| Sample Stick | A | B | C | D | E | F |
|---|---|---|---|---|---|---|
| Angle of Bevel | 40° | 35° | 30° | 25° | 22° | 20° |
| B (n · cm) | 20 | 70 | 100 | 110 | 120 | 120 |

The optimum breaking strength results from angles of inclination which are below 35°, particularly between 30° and 20°.

EXAMPLE 3

According to Example 1, glued tubes having a diameter of 43 mm are manufactured. In the procedure, webs are used which are cut to different widths and have a weight per unit area of 50 g/m², a water content of 8% and a glycerol content of 16%. The tubes thus prepared have seam areas of different widths; the width of adhesive application amounts to about 90 to 100% of the respective width of overlap (=seam area).

The tubes are fed into a shirring machine (U.S. Pat. No. 4,185,358) at a speed of 160 m/min. The sleeve-shaped shirring element of the shirring machine rotates at $U_{RE}$=5,333 rpm and the shirring mandrel (27 mm diameter) has a speed of rotation $U_s$ of 278 rpm. The results are as follows:

TABLE 3

| Sample Stick | A | B | C | D | E | F |
|---|---|---|---|---|---|---|
| Width of the Web (mm) | 135.5 | 136 | 138 | 142 | 147 | 160 |
| Width of the Seam Area (mm) | 0.5 | 1 | 3 | 7 | 12 | 25 |

Shirred sticks are obtained which have an outside diameter of 43 mm, an inner bore of 27 mm diameter, a shirring density of 100 and a pitch of the helical seam area on the stick (=distance between helical windings) of 5.75 mm.

Shirred stick D is the only stick which possesses the ideal displacement of the overlap and is also the best stick in this series of experiments, with respect to uniformity of appearance and strength.

The favorable performance properties of this shirred stick become manifest upon filling with a minced pork emulsion.

After smoking and boiling, shapely sausages of the firm pork sausage type are obtained, with one exception: In the sausages produced from stick A, the seams have opened as a result of the thermal and mechanical stresses during processing. The width of the seam of only 0.5 mm is insufficient to ensure adequate breaking strength.

Thus irrespective of the area of increased thickness, for example, in the form of a glued seam, the shirred sausage casing of the present invention has a uniform shape, a straight internal hollow space with a uniform, circular, large cross-section, and a high rigidity and breaking strength. The folds are firmly and closely held together. The sausage casing can safely be handled in transport and can be used on high-speed filling machines, without any problems. The large cross-section of the internal hollow space makes it possible to use large-diameter stuffing horns, by means of which the sausage casing can more rapidly be stuffed with sausage emulsion.

What is claimed is:

1. A shirred tubular sausage casing in the form of a hollow cylinder, comprising:
    an internal hollow space having a substantially circular cross-section;
    a strip-shaped area of increased thickness helically arranged about the longitudinal axis of the casing;
    a continuous helical main-fold structure of individual windings constituting the outside of said hollow cylinder; and
    a secondary fold structure having fold-lines which are arranged to form a continuous zig-zag line between said windings of said main-fold structure, wherein said strip-shaped area has a minimum width of about 1 mm and a maximum width amounting to about 10% of the circumference of the casing in the unshirred state and extends transversely to said main fold structure being displaced by its width with a tolerance of not more than about 10% of its width in the circumferential direction of the shirred casing between two consecutive main-fold windings.

2. A shirred sausage casing as claimed in claim 1, wherein said tolerance between said strip-shaped areas on consecutive main-fold windings is not more than about ±5% of the width of said strip.

3. A shirred sausage casing as claimed in claim 1, wherein said strip-shaped area comprises a glued seam.

4. A shirred sausage casing as claimed in claim 1, wherein said main-fold structure comprises a double layer of casing material and forms an angle of less than about 35° with respect to the longitudinal axis of the shirred casing.

5. A shirred sausage casing as claimed in claim 4, wherein said layers of said main-fold structure form an angle ranging from about 20° to 30° with respect to the longitudinal axis of the shirred casing.

6. A shirred sausage casing as claimed in claim 1, wherein said strip-shaped area of increased thickness forms between about 10 to 40 windings per 10 meters of deshirred casing.

7. A shirred sausage casing as claimed in claim 6, wherein said strip-shaped area forms between about 15 to 30 windings per 10 meters of deshirred casing.

8. A shirred sausage casing as claimed in claim 1, wherein said area of increased thickness includes a dye.

9. A shirred sausage casing as claimed in claim 3, wherein said glued seam comprises overlapped edges and an adhesive for bonding the overlapping edges in the overlapping region.

10. A shirred sausage casing as claimed in claim 9, further comprising a filmstrip for bonding the overlapping edges of said overlapping region.

11. A shirred sausage casing as claimed in claim 3, wherein the helical windings of said glued seam have a uniform pitch on the shirred casing.

* * * * *